United States Patent Office 3,457,126
Patented July 22, 1969

3,457,126
AQUEOUS EXPLOSIVE COMPOSITION CONTAINING A POROUS WATER INSOLUBLE SYNTHETIC ORGANIC POLYMERIC CELLULAR MATERIAL
Robert Travers, Box Hill, Victoria, and Norman McL. Jardine, Highett, Victoria, Australia, assignors to Imperial Chemical Industries of Australia and New Zealand Limited, Melbourne, Victoria, Australia, a company, of Australia
No Drawing. Filed Apr. 26, 1968, Ser. No. 724,633
Claims priority, application Australia, May 16, 1967, 21,822/67
Int. Cl. C06b 1/00, 11/00
U.S. Cl. 149—2     9 Claims

ABSTRACT OF THE DISCLOSURE

Explosive slurries comprising at least one oxygen releasing inorganic salt; at least one fuel; water; and at least one water insoluble cellular material in particulate form.

---

This invention relates to new compositions of matter and in particular it relates to new explosive compositions of matter.

Explosive compositions in the form of slurries and comprising inorganic oxidising salts, fuels of the water- soluble or water-insoluble type and water, optionally together with metals and conventional thickeners, dispersing agents, cross-linking promotors and cross-linking retardants are known. We have noted during the formation of such slurried mixtures that air is entrained into the slurry and that the said air remains in the mixture in the form of bubbles. Whilst the presence of air in the mixture is desirable for sensitising the slurry we have noted that the bubbles so formed vary in size and the volume of entrained air tends to be variable from mix to mix. Variations in the amount of air admixed may also cause variations in the density of the explosive mixture; thus different volumes of bore-holes may be required for a given weight of the explosive mixture.

Surprisingly we have now found that the sensitivity to detonation of certain explosive slurries is greatly enhanced if there is added to them an amount of a cellular material in particulate form and preferably in the form of a foamed particle. Furthermore we have found that the addition of such cellular material permits improved control of the density of the slurry and reduces variation in its sensitivity both immediately after mixing and on prolonged storage.

Accordingly we provide explosive slurries comprising firstly, at least one oxygen releasing inorganic salt selected from the group consisting of inorganic nitrates, chlorates and perchlorates and mixtures thereof; secondly, at least one fuel which may be water soluble, sparingly water soluble or water insoluble; thirdly, water; and fourthly, at least one water insoluble cellular material in particulate form.

We prefer that the oxygen releasing salt be chosen from the nitrates of the alkali metals or ammonium and of these we prefer sodium nitrate and ammonium nitrate. The amount of oxygen releasing salt in our compositions is not narrowly critical; we have found that compositions containing amounts of oxygen releasing salts from 50% w./w. to 90% w./w. of the total composition are satisfactory and amounts from 65% w./w. to 85% w./w. are preferred. The particle size and shape of the oxygen releasing salt is not critical and is well known from the art of ammonium nitrate manufacture; powders and prilled particles are satisfactory.

The nature of the fuels in our composition is determined by the requirements that they burn in the presence of oxygen or an oxygen containing gas and that their physical nature is such that they may be incorporated in our compositions in a manner so as to be substantially uniformly distributed throughout the compositions. Such fuels are well known in the art and they may be organic or inorganic and may also be derived from animals and plants.

Suitable water soluble fuels are organic water soluble substances for example urea, carbohydrates such as sugars or molasses, water soluble alcohols, glycols, glues or mixtures of these. The proportion of water soluble fuel in our compositions should be at least 0.8% w./w. and may be as high as 8% w./w. of the total composition. Amounts from 4% w./w. to 7% w./w. of the total composition are preferred.

Suitable water insoluble or sparingly water soluble fuels may be chosen from inorganic materials for example sulphur, aluminum, silicon, magnesium, boron, mixtures thereof and mixtures of aluminium with ferrosilicon, or organic materials for example dinitrotoluene, nitrobenzene, finely divided charcoal, anthracite, asphalt, cellulosic materials such as sawdust, or cereal products for example flours, dextrins or starches. When the inorganic fuel is a metal it is preferably in powder form ranging in particle size from very fine, for example a powder passing a 200 B.S.S. sieve, to coarse, for example a powder retained on a 30 B.S.S. sieve. However, slurries containing such water insoluble hydrophobic metallic fuels are already highly sensitive to detonation even in the absence of our cellular material; consequently the improvement obtained by the addition of cellular material is less pronounced. The proportion of water insoluble or sparingly water soluble non-metallic fuels in our compositions should be in the range from 2% w./w. to 10% w./w. of the total composition and amounts from 4% w./w. to 7% w./w.

of the total composition are preferred. The proportion of metallic water insoluble fuels when present in our compositions may be as high as 25% w./w. and amounts in the range from 5% w./w. to 20% w./w. of the total compositions are preferred.

The proportion of water in our compositions should be sufficient to dissolve at least part of the water soluble fuel when present, and part of the oxygen releasing inorganic salt, but not be in excess of the explosive limit of the composition. We prefer that the water be in the range from 5% w./w. to 25% w./w. of the total composition and more preferably in the range from 12% w./w. to 17% w./w. of the total composition.

The nature of the water insoluble cellular material is determined by the requirement that a large proportion of the admixed air in the explosive composition is retained in the cells of the material and that the cells are fractured readily during the detonation of the explosive mixture. Thus benefits may be derived from the use of combustible organic porous materials, e.g. cork or coke. However, preferred cellular materials are the synthetic organic polymeric foams of, for example, polystyrene, polyurethane, polyethylene, polypropylene, polyvinyl chloride, polybutadiene, rubber or copolymers of these materials with other polymeric substances. Most preferred are polystyrene foam and polyurethane foam. The water insoluble cellular material should be porous, and should retain air or oxygen containing gases on its surface and/or in its cells. It should have a cellular structure and the cellular structure of the water insoluble materials should be such that the material has a high proportion of closed cells.

The thickness of material forming the walls of the cellular structure should be sufficient to prevent collapse of the cells prior to, and during, the incorporation of the cellular material into our compositions, but they should be sufficiently thin and/or brittle to enable the cells to be ruptured when our compositions are detonated.

The amount of water insoluble cellular material present in our compositions is determined by the requirements of the desirable degree of physical characteristics of the composition. It is also related to the physical and chemical nature of the water insoluble cellular material itself. We have found that satisfactory amounts of water insoluble cellular material range from 0.2% w./w. to 1% w./w. and that preferred amounts of water insolube cellular materials are from 0.2% w./w. to 0.5% w./w. of the total composition.

The size of the cells, the distribution of various sizes of cells and the degree of expansion due to foaming of the water insoluble cellular material is not narrowly critical; thus for example suitable foams may have a density ranging from 0.3 to 5 lbs. per cubic foot. We prefer that the water insoluble cellular materials have a density ranging from 1 to 4 lbs. per cubic foot. For the practice of formulating explosive slurries it is often convenient to refer not to the actual density of the foam but to its free flowing bulk density, i.e. the density of the foam when freely poured into a cylindrical container. Defined in these terms a free flowing bulk density from 10 g./l. to 50 g./l. is preferred.

The particulate form of the cellular material is not narrowly critical. Thus it may be in the form of irregular or regular shaped particles such as, for example, pellets, cubes, polyhedrons or spheres. Such shaped particles may be obtained by known means. The maximum linear dimensions of the said particles of the cellular material are not narrowly critical; suitable maximum dimensions are in the range from 1 to 10 mm., preferably in the range from 1 to 5 mm.

Where desirable, it is convenient to add to the compositions according to our invention, in amounts expressed as parts by weight per 100 parts by weight of the final mixture, conventional dispersing agents, for example glycol which may itself be a water soluble fuel, in amounts in the range e.g. from 1 to 5 parts; conventional thickeners, for example guar gum, in amounts in the range from e.g. 0 to 1 part; conventional cross-linking promotors, for example zinc chromate, in amounts in the range e.g. from 0 to 0.5 part; conventional cross-linking retardants, for example tartaric acid, in amounts ranging e.g. from 0 to 0.1 part or conventional anti-foaming agents, for example ethyl hexanol, in amounts ranging e.g. from 0 to 0.1 part.

Compositions according to our invention are advantageous in that they may be prepared to give compositions which have increased sensitivity over similar explosive compositions not containing said cellular materials. This permits blasting in smaller holes down to a diameter of 1″ or less and thus increases the range of applications of slurried explosives. The improved control of density of our compositions also permits more accurate and more reproducible charging of boreholes. The improved control of the amount of air admixed in our compositions enables a substantially constant amount of air to be admixed in successive batches of our compositions and this gives a better reproducibility of sensitivity in our compositions. The constant amount of air or oxygen permanently trapped in the cellular material maintains sensitivity more nearly constant than is possible with prior art slurries which may gradually lose their air or oxygen content. Consequently the safe period of storage is extended. The increased sensitivity of our compositions also permits savings resulting from the reduction of the amount of detonating material required.

Our invention is now illustrated by, but not limited to, the following examples in which parts and percentages are expressed on a weight basis.

EXAMPLES 1 TO 39 INCLUSIVE

Using a mixer of the Schraeder type having a capacity of 20 lbs., a blasting explosive was prepared by mixing the substances set out in Table I in amounts set out in Table I. The density of the composition and the amount of pentolite priming composition or the number of detonators required to detonate the composition were determined and these results are also set out in Table I. Examples 1, 7, 9, 11, 13, 15, 17, 19, 21, 23, 25, 27, 30, 34, 36 and 38 are not within our invention and are included for purposes of comparison.

Notes on Table I (1) All prilled ammonium nitrate used in these experiments was in the form of uncoated prills, 2 to 3 mm. in diameter.

(2) The fine ammonium nitrate was in the form of a powder 100% passing a 6 B.S.S. sieve, 51% passing a 36 B.S.S. sieve and 18% passing a 100 B.S.S. sieve.

(3) The sodium nitrate was in the form of a coarse powder.

(4) The aluminium powder passed a 25 B.S.S. sieve, not less than 70% was retained on a 100 mesh B.S.S. sieve and not less than 95% was retained on a 300 B.S.S. sieve.

(5) The aluminium powder (paint fine) was of the type conventionally used for purposes of pigmentation.

(6) The polystyrene foam had a free flowing bulk density of 14 g./l. and was comprised of particles about ⅛″ diameter.

(7) The polyurethane foam had a density of 1.4 lbs./cubic foot and was comprised of particles about ¼″ diameter.

(8) The silicon powder was in the form of a powder, 95% passing a 30 B.S.S. sieve, 90% passing a 100 B.S.S. sieve.

(9) The molasses contained 20% w./w. of water.

(10) The polystyrene of Examples 32 and 33 was comprised of particles passing a 5 mesh B.S.S. sieve and 95% of these were retained on a 30 mesh B.S.S. sieve. The free flowing bulk density was 24 g./l. for Example 32 and 49 g./l. for Example 33.

3,457,126

TABLE 1.—EXAMPLES 1 TO 39 INCLUSIVE

| Ingredient expressed in grams: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Prilled ammonium nitrate (1) | 73.4 | 73.3 | 73.2 | 73.1 | 76.7 | 80.95 | 46.2 | 46.0 | 63.4 | 62.9 | 71.4 | 69.9 | 68.4 | 68.0 | 68.4 | 68.0 | 68.4 | 68.0 | 68.4 | 68.0 | 68.4 | 68.0 | 68.4 | 68.0 |
| Fine ammonium nitrate (2) | | 2.0 | 2.0 | 2.0 | | | 19.2 | 19.0 | 8.0 | 8.0 | 4.0 | 4.0 | 2.0 | 2.0 | 2.0 | 2.0 | 2.0 | 2.0 | 2.0 | 2.0 | 2.0 | 2.0 | 2.0 | 2.0 |
| Sodium nitrate (3) | 5.0 | 5.0 | 5.0 | 5.0 | | | 18.0 | 18.0 | 6.0 | 6.0 | | | 10.0 | 10.0 | 10.0 | 10.0 | 8.0 | 8.0 | 8.0 | 8.0 | 8.0 | 8.0 | 8.0 | 8.0 |
| Aluminium powder (4) | | | | | | | 2.0 | 2.0 | | | | | | | | | | | | | | | | |
| Aluminium powder (paint fine) (5) | 5.0 | 5.0 | 5.0 | 5.0 | 6.5 | 5.0 | | | | | 5.0 | 5.0 | | | | | | | | | | | | |
| Sucrose | | | | | | | | | | | | | 5.0 | 5.0 | | | | | | | | | | |
| Urea | | | | | | | | | 4.0 | 4.0 | | | | | 5.0 | 5.0 | | | | | | | | |
| Ethylene glycol | | | | | | | 0.9 | 0.9 | | | | | | | | | 7.0 | 7.0 | 7.0 | 7.0 | 7.0 | 7.0 | 7.0 | |
| Sulphur | | | | | | | | | 4.0 | 4.0 | | | | | | | | | | | | | | 7.0 |
| Wheat flour | | | | | | | | | | 0.5 | | | | | | | | | | | | | | 0.4 |
| Polystyrene foam (6) | | 0.1 | 0.2 | 0.3 | 0.2 | | | 0.4 | | | | 0.5 | | 0.4 | | 0.4 | | 0.4 | | 0.4 | | | | |
| Polyurethane foam (7) | | | | | | | | | | | | | | | | | | | | | | | | |
| Guar gum | 0.5 | 0.5 | 0.5 | 0.5 | 0.5 | 0.2 | 0.6 | 0.6 | 0.5 | 0.5 | | 0.5 | 0.5 | 0.5 | 0.5 | 0.5 | 0.5 | 0.5 | 0.5 | 0.5 | 0.5 | 0.5 | 0.5 | 0.5 |
| Zinc chromate | 0.1 | 0.1 | 0.1 | 0.1 | 0.05 | 0.05 | 0.1 | 0.1 | 0.1 | 0.1 | | 0.1 | 0.1 | 0.1 | 0.1 | 0.1 | 0.1 | 0.1 | 0.1 | 0.1 | 0.1 | 0.1 | 0.1 | 0.1 |
| Tartaric acid | 0.01 | 0.01 | 0.01 | 0.01 | | | 0.01 | 0.01 | 0.01 | 0.01 | | 0.01 | 0.01 | 0.01 | 0.01 | 0.01 | 0.01 | 0.01 | 0.01 | 0.01 | 0.01 | 0.01 | 0.01 | 0.01 |
| Water | 14.0 | 14.0 | 14.0 | 14.0 | 16.25 | 13.0 | 13.0 | 13.0 | 13.0 | 13.0 | | | 14.0 | 14.0 | 14.0 | 14.0 | 14.0 | 14.0 | 14.0 | 14.0 | 14.0 | 14.0 | 14.0 | 14.0 |
| Ethyl hexanol | 0.01 | 0.01 | 0.01 | 0.01 | | | | | | | | | | | | | | | | | | | | |
| 50:50 Wax/Woodmeal | | | | | | | | | | 4.0 | | | | | | | | | | | | | | |
| Silicon powder (8) | | | | | | | | | | | 5.0 | 5.0 | | | | | | | | | | | | |
| Density (gm./cc.) | 1.24 | 1.17 | 1.11 | 1.06 | | | 1.34 | 1.23 | 1.38 | 1.15 | 1.38 | 1.08 | 1.48 | 1.17 | 1.48 | 1.17 | 1.31 | 1.22 | 1.56 | 1.27 | 1.31 | 1.28 | 1.48 | 1.25 |
| Diameter of charge (in.) | 4 | 4 | 4 | 4 | 4 | 4 | 4 | 4 | 4 | 4 | 5 | 5 | 5 | 5 | 5 | 5 | 5 | 5 | 5 | 5 | 5 | 5 | 5 | 5 |
| Pentolite required to detonate¹ (g.) | >250 | >250 | 100 | 60 | 50 | 30 | | | >250 | 50 | >250 | 50 | >250 | 150 | >250 | 30 | 50 | 10 | >250 | 80 | >150 | 40 | >250 | 80 |
| No. of No. 8 aluminium detonators to detonate | | | | | | | 6 | 4 | | | | | | | | | | | | | | | | |

| Ingredient expressed in grams: | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|
| Prilled ammonium nitrate | 68.4 | 67.2 | 73.4 | 73.0 | 72.6 | 68.0 | 68.0 | 68.0 | 67.8 | 72.0 | 71.5 | 82.0 | 81.5 | 53.1 | 52.6 |
| Fine ammonium nitrate | 2.0 | 2.0 | 2.0 | 2.0 | 2.0 | 2.0 | 2.0 | 2.0 | 2.0 | 3.0 | 3.0 | 3.0 | 3.0 | | |
| Sodium nitrate | 7.0 | 7.0 | 5.0 | 5.0 | 5.0 | 10.0 | 10.0 | 5.0 | 10.0 | 10.0 | 10.0 | | | 5.0 | 5.0 |
| Aluminium powder | 5.0 | 5.0 | 5.0 | 5.0 | 5.0 | 5.0 | | 5.0 | 5.0 | | | | | 15.0 | 15.0 |
| Sucrose | | | | | | | | | | | | | | 8.0 | 8.0 |
| Molasses (9) | | 0.2 | | | | | | | | 8.0 | 8.0 | 8.0 | 8.0 | | |
| Polystyrene foam (10) | | | | | | | 0.4 | 0.4 | 0.6 | | 0.5 | | | | 0.5 |
| Granulated cork | | | | | 0.8 | | | | | | | | | | |
| Guar gum | 0.5 | 0.5 | 0.5 | 0.4 | 0.5 | 0.5 | 0.5 | 0.5 | 0.5 | 0.5 | 0.5 | 0.5 | 0.5 | 0.8 | 0.8 |
| Zinc chromate | 0.1 | 0.1 | 0.1 | 0.5 | 0.1 | 0.1 | 0.1 | 0.1 | 0.1 | 0.2 | 0.2 | 0.2 | 0.2 | 0.1 | 0.1 |
| Tartaric acid | 0.01 | 0.01 | 0.01 | 0.01 | 0.01 | 0.01 | 0.01 | 0.01 | 0.01 | 0.02 | 0.02 | 0.02 | 0.02 | | |
| 2-ethyl hexanol | | | | | | | | | | 0.03 | 0.03 | 0.03 | 0.03 | 0.01 | 0.01 |
| Water | 14.0 | 15.0 | 14.0 | 14.0 | 14.0 | 14.0 | 14.0 | 14.0 | 14.0 | 6.3 | 6.3 | 6.3 | 6.3 | 18.0 | 18.0 |
| Silicon powder | 3.0 | 3.0 | | | | | | | | | | | | | |
| Density (gm./cc.) | 1.25 | 1.18 | 1.17 | 1.09 | 1.07 | 1.40 | 1.16 | 1.17 | 1.18 | 1.35 | 1.10 | 1.28 | 1.03 | 1.42 | 1.26 |
| Diameter of charge (in.) | 2.5 | 2.5 | 5 | 5 | 5 | 4 | 4 | 4 | 4 | 4 | 4 | 4 | 4 | 5 | 5 |
| Pentolite required to detonate (g.) | >150 | 150 | 40 | 20 | 20 | 150 | 100 | 100 | 100 | 30 | 6 | 20 | 5 | >250 | 150 |

¹ By >250 or >150 respectively we mean that detonation did not occur when 250 g. or 150 g. respectively of pentolite were used.

EXAMPLE 40

The composition of Example 25, which was prepared for comparative purposes, and the composition of Example 26 were each treated in the following manner.

The composition was cartridged in a 3¼" diameter polyethylene cylinder and placed in a 4" diameter pipe filled with water. Both compositions were detonated using a 150 g. pentolite primer. When the diameter of the polyethylene cylinder was reduced to 2½" the composition of Example 25 failed to detonate with a 150 g. pentolite primer, but the composition of Example 26 detonated under identical conditions. Furthermore when two similar 2½" diameter cartridges containing the composition of Example 26 were connected together, the detonation of one cartridge with a 150 g. pentolite primer detonated the second cartridge which had no such primer.

EXAMPLE 41

Example 40 was repeated but, prior to cartridging, the composition was pumped through a "Mono" pump. ("Mono" is a registered trademark.) This pump is of the positive displacement type fittted with a screw feed and due to the nature of its operation loosely bound or free air tends to be removed from compositions passing through it. No detontaion of the composiiton of Example 25 at either diameter of cartridge could be obtained. When the composition of Example 26 was used, results similar to those obtained with it in Example 40 were observed. This example demonstrates the enhanced sensitivity to detonation of compositions according to our invention and their improved capability of retaining air within the composition during pumping.

EXAMPLE 42

The control composition of Example 30 was stored for one month and it was found that the diameter of the charge from the stored composition had to be increased to 5" to obtain detonation with 150 g. of a pentolite primer. This demonstrates a reduction in sensitivity to detonation of the stored control composition. Over the same period the sensitivity to detonation of the composition of Example 31 was unchanged.

We claim:
1. A composition of matter consisting essentially of (1) at least one oxygen releasing inorganic salt selected from the group consisting of ammonium nitrates, chlorates, and perchlorates, and alkali metal nitrates, chlorates and perchlorates present in an amount from 50 parts to 90 parts; (2) at least one fuel selected from the group consisting of water soluble fuel present in an amount from 0.8 to 8 parts, non-metallic sparingly water soluble and non-metallic water insoluble fuel present in an amount from 2 to 10 parts, and metallic water insoluble fuels present in an amount from 5 to 20 parts; (3) water present in an amount from 7 to 20 parts; and (4) at least one water insoluble synthetic organic polymeric cellular material in particulate form which is porous and retains air or oxygen containing gases on its surface and in its cells, present in an amount from 0.2 to 1 part, all amounts being in parts by weight per 100 parts of the composition.

2. A composition of matter according to claim 1 wherein the oxygen releasing salt is selected from the group consisting of the nitrates of sodium and ammonium.

3. A composition of matter according to claim 1 wherein the oxygen releasing salt constitutes from 65% w./w. to 85% w./w. of the total composition.

4. A composition of matter according to claim 1 wherein the water soluble fuel constitutes from 4% w./w. to 7% w./w. of the total composition.

5. A composition of matter according to claim 1 wherein the non-metallic sparingly water soluble or non-metallic water insoluble fuel constitutes from 5% w./w. to 20% w./w. of the total composition.

6. A composition of matter according to claim 1 wherein water constitutes from 12% w./w. to 17% w./w. of the total composition.

7. A composition of matter according to claim 1 wherein the water insoluble organic synthetic polymeric cellular material is polystyrene foam.

8. A composition of matter according to claim 1 wherein the water insoluble organic synthetic polymeric cellular material is polyurethane foam.

9. A composition of matter according to claim 1 wherein the water insoluble organic synthetic polymeric cellular material constitutes from 0.2% w./w. to 0.5% w./w. of the total composition.

References Cited

UNITED STATES PATENTS

| | | | |
|---|---|---|---|
| 2,768,072 | 10/1956 | Stark | 149—2 X |
| 3,049,454 | 8/1962 | Stark | 149—2 |
| 3,198,677 | 8/1965 | Thomas | 149—2 X |
| 3,212,944 | 10/1965 | Lyon et al. | 149—46 X |
| 3,249,474 | 5/1966 | Clay et al. | 149—44 X |
| 3,282,752 | 11/1966 | Clay et al. | 149—44 X |
| 3,282,754 | 11/1966 | Gehrig | 149—46 X |
| 3,288,658 | 11/1966 | Ferguson et al. | 149—2 X |
| 3,288,661 | 11/1966 | Swisstack | 149—2 X |
| 3,376,176 | 4/1968 | Gehrig | 149—46 |
| 3,338,165 | 8/1967 | Minnick | 149—89 X |

CARL D. QUARFORTH, Primary Examiner

S. J. LECHERT, Assistant Examiner

U.S. Cl. X.R.

149—21, 22, 44, 60, 61, 62, 70, 71, 76, 83, 85